May 16, 1944.  E. F. JACKMAN  2,349,170
SEALING DEVICE
Filed Jan. 23, 1942
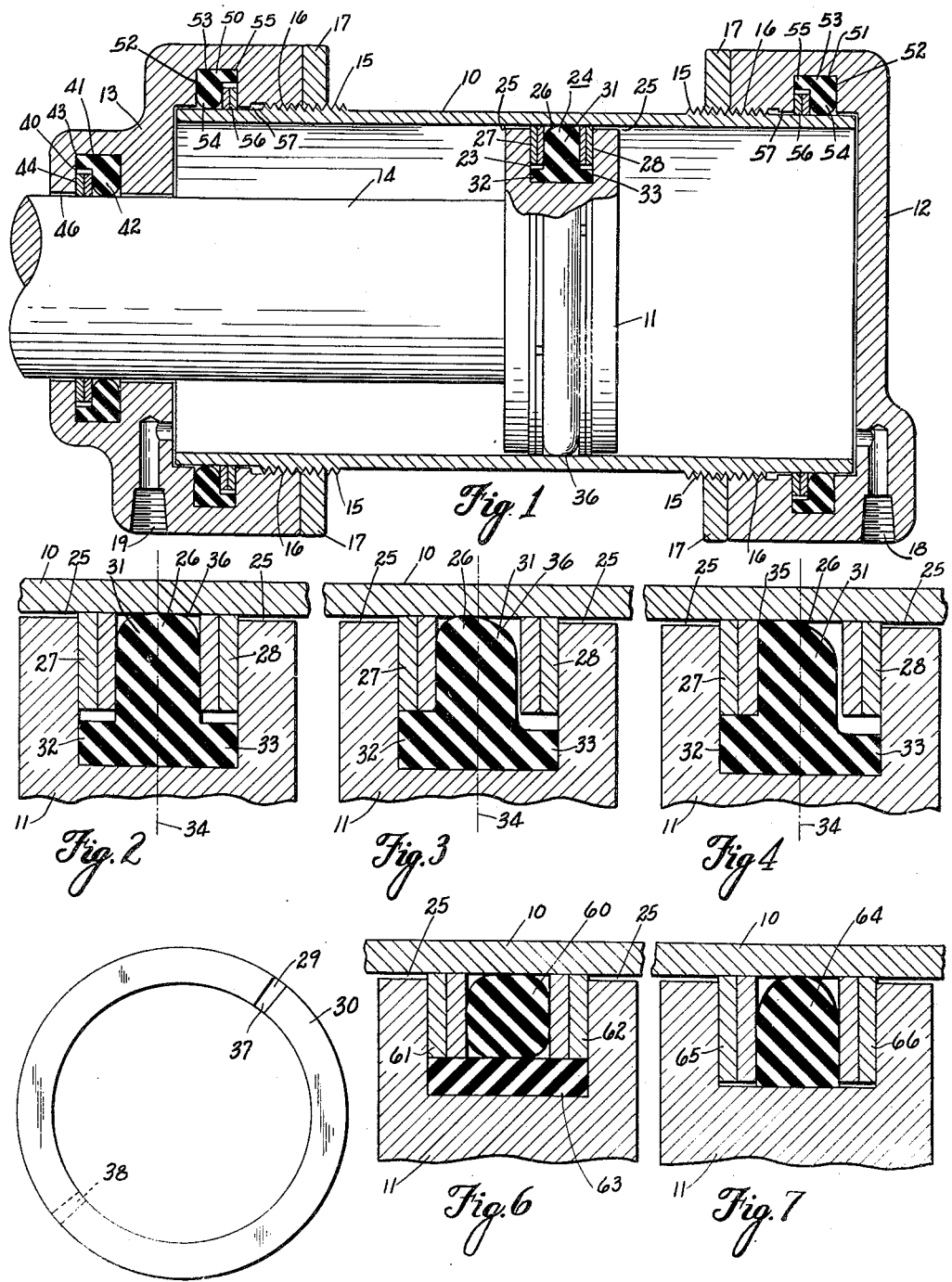
INVENTOR.
Elmer F. Jackman
BY Woodling and Krost
attys Patented May 16, 1944

2,349,170

UNITED STATES PATENT OFFICE 2,349,170

SEALING DEVICE

Elmer F. Jackman, Lakewood, Ohio, assignor to George V. Woodling and said Jackman, co-trustees, as joint assignee Application January 23, 1942, Serial No. 427,965

16 Claims. (Cl. 309—23)

My invention relates in general to sealing devices and more particularly to sealing devices for sealing the circumferential clearance between two interfitting circular parts such, for example, as the circumferential clearance between a piston and a cylinder, between a piston rod and the housing through which it passes, between a cylinder and a cylinder head, or between any other interfitting circular parts of like construction.

An object of my invention is the provision of a sealing device of relatively low cost and of such a construction that it may be easily assembled.

Another object of my invention is the provision of a sealing device having a relatively low friction between itself and the part that it engages while at the same time giving very low leakage.

Another object of my invention is the provision of a sealing device which accommodates itself to relatively large variations in dimension and thereby avoids the necessity of high accuracy in the finishing and machining of the parts which are to be sealed.

Another object of my invention is the provision of a sealing device which will give a long wearing life.

Another object of my invention is the provision of a sealing device which may be operated under extremely low temperature conditions.

Another object of my invention is the provision of a sealing device which is self-centering.

Another object of my invention is the provision of a sealing device which accommodates itself for variations in the expansion and contraction of the metal of the surrounding parts resulting from temperature and pressure changes.

Another object of my invention is the provision of a sealing device which prevents extrusion into the circumferential clearance between the interfitting parts surrounding the sealing device.

Another object of my invention is the provision of a sealing device which cannot "break down" in service in that it will always continue to work even though the sealing member should break or crack under low temperature.

Another object of my invention is to prevent the extrusion of a sealing device which employs a relatively soft and deformable material as a sealing member.

Another object of my invention is the provision of a non-extrusion sealing device which prevents locking or wedging between the two interfitting circular parts that it seals.

Another object of my invention is the provision of a sealing device which will operate under extremely high fluid sealing pressures.

Other objects and a fuller understanding of my invention may be had by referring to the following description and claims, taken in conjunction with the accompanying drawing; in which:

Figure 1 represents a cross-sectional view of a cylinder assembly embodying sealing devices made in accordance with the provisions of my invention;

Figures 2, 3 and 4 are fragmentary enlarged cross-sectional views of a sealing device embodying the features of my invention and show the conditions of my sealing device under various fluid sealing pressures;

Figure 5 is a side elevational view of my non-extruding rings or washers employed in the construction of my sealing device;

Figure 6 shows a fragmentary and enlarged cross-sectional view of a sealing device constituting a modification in my design; and Figure 7 shows another modified embodiment of a seal embodying the features of my invention.

With reference to Figure 1, I have illustrated my sealing devices in connection with a cylinder assembly comprising a cylinder 10 and a piston 11 reciprocally movable therein. The cylinder 10 is provided at its right-hand end with a cylinder head 12 and at its left-hand end with a cylinder head 13 through which the piston rod 14 moves. The cylinder heads 12 and 13 may be removably secured to the ends of the cylinder 10 by means of threads 15 on the cylinder which are threadably engaged by threads 16 on the cylinder head. A lock nut 17 threadedly engaging the threads 15 on the cylinder may be employed to hold the cylinder head against rotation when once assembled. As illustrated, the cylinder head 12 is provided with a fluid port 18 and the cylinder head 13 is provided with a fluid port 19. In connecting the cylinder assembly in fluid circuit relation with a fluid system, it may be necessary to rotate either one or both of the cylinder heads to make the fluid ports 18 and 19 align themselves with the fluid connection. In the illustration as shown in Figure 1, this may be readily done by loosening the lock nut 17 and threadably turning the cylinder head with respect to the cylinder. When the cylinder head is once turned to its proper location, the locking nut 17 may again be tightened to prevent the rotation of the cylinder head.

In the cylinder assembly illustrated, there are four seals used embodying the features of my invention in that there is a seal between the piston 11 and the cylinder 10, a seal between the piston rod 14 and the cylinder head 13 through which it passes and two seals of like construction between the cylinder 10 and cylinder heads 12 and 13.

The seal between the piston 11 and the cylinder 10 is indicated generally by the referenc character 24 and will be described first. As illustrated, the seal 24 is arranged to be mounted in a groove 23 in the piston and comprises a sealing member on endless ring 26 and radially yieldable means or annuli 27 and 28 mounted on the opposite sides thereof and engaging the internal surface of the cylinder 10. The sealing member 26 has a radially disposed extension portion 31 and two oppositely disposed lateral shoulders 32 and 33 which rest in the bottom of the groove 23 of the piston. The top edge of the radially disposed extension portion 31 may be arcuate or crowned to give a relatively narrow edge for contacting the internal surface of the cylinder. This gives a relatively low friction between the sealing member 26 and the cylinder. The sealing member 26 may be constructed of any suitable rubber-like oil resisting material now available on the market. In the practice of my invention I preferably make the sealing member 26 of relatively soft rubber-like material which is readily conformable to the groove and the inside surface of the cylinder. A good sealing engagement is effected between the piston and the cylinder by virtue of the soft and deformable nature of the sealing member and as such it is subject under relatively high fluid sealing pressures to extrusion into the circumferential clearance 25 between the piston and the inside surface of the cylinder. In order to prevent this extrusion, I provide radially yieldable means 27 and 28 on opposite sides of the radially disposed extension portion 31 of the sealing member 26. The radially yieldable means 27 and 28 are of like construction and may comprise at least two split washers 29 and 30 having their open spaces 37 and 38 circumferentially displaced with respect to each other to prevent the extrusion of the sealing member 26 therethrough. The circumferential displacement of the open spaces 37 and 38 of the split washers 29 and 30 is shown in Figure 5. The split washers 29 and 30 are made of material having good wearing qualities. The nature of the material depends upon the particular application of the invention. Under certain applications, the applicant finds that phenolic laminated products or phenol condensation products make a good material. Fibrous or plastic materials may also be used. In other applications certain metals and alloys may be employed. Tests show that excellent operating results are obtained with materials possessing durable wearing qualities and having the property of being radially yieldable and substantially non-compressible in a longitudinal direction.

Figures 2, 3 and 4 illustrate by enlarged cross-sectional views the operating condition of my sealing device 24 under various fluid sealing pressures. Figure 1 illustrates the condition of the sealing member 26 and the radially yieldable means 27 and 28 when no pressure or a relatively low fluid sealing pressure is acting upon the sealing device. Thus, in Figure 2 the sealing member 26 is substantially symmetrical with respect to a central reference line indicated by the reference character 34. The outer circumferential edges of the radially yieldable means 27 and 28 are engaging the inside surface of the cylinder by reason of their own yieldable character and are not being forced radially outwardly by any deformation or flowing of the rubber-like material of which the sealing member 26 is made. The inner edges of the radially yieldable means 27 and 28 are positioned to encircle the laterally disposed shoulders 32 and 33, respectively, and in the preferred form of my invention there is a slight circumferential gap between the inner end of the radially yieldable means 27 and 28 and the laterally disposed shoulders 32 and 33, although the seal may be made without this gap.

In Figure 3 I have illustrated the relationship of the parts of the sealing device 24 as the fluid sealing pressure increases in value. The increased fluid sealing pressure is applied to the side of the sealing device which is to the right of the central reference line 34 and operates to compress the sealing member 26 on the left-hand side of the central reference line 34 to conform to the radially yieldable means 27 and the wall structure of the groove 23 and the inside surface of the cylinder 10. That is to say, the rubber-like material of the sealing member 26 flows until the laterally disposed shoulder 32 swells up and engages the inside edges of the radially yieldable means 27 and forcibly urges the outside edge of the radially yieldable means 27 against the inside surface of the cylinder 10. In the illustration of Figure 3, the arcuate or crown top 36 of the sealing member 26 has not as yet been deformed sufficiently to reach the point of extrusion between the piston 11 and the cylinder 10. In Figure 4 I have illustrated the condition where an increased amount of fluid sealing pressure has been applied to the right-hand side of the seal. Under this condition the sealing member 26 is illustrated as having reached its point of extrusion except that in my device no extrusion takes place because the radially yieldable means 27 is forced outwardly against the inside surface of the cylinder and prevents such extrusion. However, in the absence of my radially yieldable means 27, the sealing member 26 at the point 35 would extrude into the circumferential clearance 25. In actual tests I find that the extrusion of the sealing member 26 occurs even though the circumferential clearance 25 is kept to a low minimum by extremely fine machine and finishing work. Regardless of how small the circumferential clearance 25 may be made in actual construction, the extrusion of the sealing member 26 nevertheless takes place because the soft and deformable rubber-like material from which my sealing member 26 is made will still flow thereinto. Even though the circumferential clearance 25 may be machined to an extremely fine tolerance yet the variations in the circumferential clearance due to temperature changes and to the radial stretching of the cylinder wall 10 is sufficient to allow extrusion to take place. In other words, the extrusion of the soft sealing member 26 cannot be prevented by maintaining close tolerances in the manufacture of the piston and the cylinder. When extrusion takes place the piston locks or jams within the cylinder and renders the unit inoperative. Just as soon as a locking or wedging action takes place as a result of extrusion of the sealing member through the circumferential clearance, the piston is pushed to one side of the cylinder and produces faulty operation. In my invention, the locking or the wedging of the piston within the cylinder as a result of extrusion is totally eliminated. Furthermore, my sealing device 24 operates to center the piston within the cylinder because the radially yieldable means 27 and 28, as the case might be, are urged outwardly against the inside surface of the cylinder by the flowing of the material of the sealing member under the inside edges thereof. In other words, my sealing device not only operates as a sealing arrangement but also operates as a self-centering device to maintain perfect operation of the piston within the cylinder.

In my invention I preferably make the design such that the radially yieldable means are pushed out against the inside surface of the cylinder by the flowing of the material of the sealing member prior to the time that the sealing member is deformed sufficiently to reach the point of extrusion. In other words, the condition as illustrated in Figure 3 takes place before the condition as illustrated in Figure 4 takes place. The employment of the radially yieldable means in my invention enables me to use much softer material for the sealing member 26 than would be the case in the absence of my radially yieldable means. Inasmuch as the sealing member may be made of relatively soft material, I am able to obtain a very good sealing engagement to withstand extremely high fluid sealing pressures and yet avoid extrusion. My sealing device is very important in connection with actuating cylinders for airplanes where at high altitudes the operating temperature may recede to as low as 60 degrees below zero. Under this extremely cold condition, the sealing member tends to lose its normal characteristics and may even crack or become pulverized. Should this situation prevail with my seal, it still remains operative for the reason that the radially yieldable means 27 and 28 still retain cracked or pulverized material within the confining wall structure.

In assembling the sealing member 26 into the groove 23 it is only necessary to stretch the sealing member until it can be mounted into the groove. After the sealing member 26 is placed in the groove, the radially yieldable means 27 and 28 comprising washers 29 and 30 are "wormed" or threaded into the groove 23. That is to say, one end of the split washer is first inserted into the groove and then the remaining part of the washer is gradually worked into the groove somewhat in a thread-like fashion. The radially yieldable washers 29 and 30 may be made into several parts wherein they may be then readily inserted into the groove without the worming action just described but I find from actual practice that I prefer the split type of washer as illustrated in Figure 5 since they can be readily wormed into the groove without any trouble whatsoever. As illustrated in Figure 5, the washers after they are once placed in the groove are radially turned with respect to each other until the open spaces 37 and 38 are dis-aligned to prevent the sealing member 26 from extruding therethrough. When the thus assembled piston, sealing member and washers are assembled with the cylinder, part of the peripheral surface of the sealing member engages with the opposed surface of the cylinder and the piston and cylinder exert pressure on the sealing member which is greatest between the axial ends of the area of contact of the sealing member with the cylinder and which deforms the substantially noncompressible material of the sealing member. Thus, when the cylinder, piston and sealing member are in operatively assembled position, the sealing member is somewhat distorted, as is shown by Fig. 2. Substantially the same condition exists in the other illustrated adaptations of the invention where the sealing member is in a groove in a fixed member and engages with a sliding shaft, and also where the sealing member is in a groove in one fixed member and engages another member which is fixed after the parts are assembled. The sealing member 26, since it is made of soft rubber-like material, affords large accommodation insofar as accuracy in the size of the machine parts are concerned. That is to say, the piston and the cylinder as well as the groove may have large tolerances and yet my sealing member 26 will distort sufficiently to accommodate itself to such condition. Also, a single mold in which the sealing member 26 is made will accommodate a piston diameter ranging from one and seven-eighths inches to two and one-eighth inches. This reduces the number of molds required to make sealing members 26 for a large range of piston diameters. In addition, my sealing device accommodates for the radial stretching of the cylinder wall incident to extremely high pressures existing therein. As the cylinder wall is stretched the sealing device 24 follows radially outwardly therewith and as it contracts the sealing device contracts therewith.

The outer edge of the sealing member 26 is preferably arcuate or crowned and thereby makes an axially short contact with the inside surface of the cylinder. As a result, the friction between the sealing member and the cylinder is relatively low. As the fluid sealing pressure increases the top portion of the sealing member 26 becomes distorted as shown in Figures 3 and 4 and thereby increases the sealing action to hold the higher pressure. Accordingly, there is very little leakage with my sealing device. With my design, the sealing device has a very low "preload" in that there need be very little initial sealing force set up in the sealing device to give a sealing action for low pressure or for no pressures at all. Consequently, my sealing device has a very high efficiency from the standpoint of friction at relatively low fluid sealing pressures or at no pressure whatsoever. My sealing device is likewise advantageous in that the piston may be made by merely providing the groove therein and it is not necessary to make the piston in several parts in order to mount the sealing device thereon. It is pointed out that the illustrations in Figures 3 and 4 are merely illustrative and in no way are to be construed as representing the deformation condition of the sealing member for all situations. The actual shape of the deformed sealing member in actual practice may be somewhat different from that shown in Figures 3 and 4 but the main point to bear in mind is that the laterally disposed shoulder swells to force out the radially yieldable means 27 and 28 prior to the time that the arcuate top or crown portion 36 reaches the point of extrusion as illustrated by the point 35 in Figure 4, that is before the ring 26 deforms into and substantially fills the annular space which is defined by the cylindrical surface of one member and the blocking means and ring in the groove of the other member. As the fluid sealing pressure is applied to the seal on the left-hand side of the central reference line 34 the reverse situation takes place as that shown in Figures 3 and 4.

The next sealing device to be described is the one shown positioned between the piston rod 14 and the cylinder head 13. This sealing device operates to seal the pressure within the left-hand end of the cylinder construction and is mounted in a groove 40 provided in the cylinder head 13. The operation of the sealing device for the piston rod is the same as that described for the piston except that it needs to seal the pressure only in one direction whereas the sealing device 24 for the piston 11 was required to seal the fluid pressure in both directions. As illustrated, the sealing device for the piston rod 14 comprises a sealing member 41 and a radially yieldable means 44 comprising two split washers substantially the same as shown in Figure 5. The sealing member 41 is provided with a laterally disposed shoulder 43 and a radially diposed extension portion 42 which engages the piston rod 14. The action of the radially yieldable means 44 prevents the soft sealing member 41 from extruding into the clearance 46 between the piston rod and the cylinder head 13. The operation of the sealing member for the piston rod is the same as that described for the piston and it possesses all of the attributes heretofore mentioned with reference to the sealing device for the piston.

The sealing devices 50 and 51 for the two cylinder heads 12 and 13 are of like construction and are also substantially identical to the construction of the sealing device for the piston rod 14. The sealing devices 50 and 51 are placed in grooves 52 provided in the cylinder heads and each sealing device comprises a sealing member 53 and radially yieldable means 56 which prevent the sealing member from extruding into the clearance 57 between the cylinder head and the cylinder wall. The sealing member 53 comprises a laterally disposed shoulder 55 and a radially disposed extension portion 54 for engaging the outside surface of the cylinder wall. The operation of the sealing devices 50 and 51 is substantially the same as that for the sealing device for the piston and the piston rod. The sealing devices 50 and 51 permit the cylinder heads 12 and 13 to be threadably screwed on to the end of the cylinder 10 without interference and furthermore a good sealing engagement is made for any threadable position of the cylinder head upon the cylinder 10.

In Figure 6 I show a modification of my invention in that the sealing member 26 of the sealing device 24 is made in two separate parts comprising a round sealing member 60 and an annular body of material 63 positioned in the bottom of the groove of the piston. On opposite sides of the round sealing member 60 are placed the radially yieldable means 61 and 62 which prevent the sealing member 60 from extruding through the clearances 25. The operation of the modified form of my invention in Figure 60 is substantially the same as that described for the sealing device 24 for the piston 11. In Figure 6, however, I show no gap between the inside edge of the radially yieldable means 61 and 62 and the annular body of material 63 but it is understood that a gap may be employed the same as that shown for the sealing device 24. The fluid sealing pressure causes the annular body of material 63 which is soft and made of substantially the same material as the sealing member 61 is made to flow and radially force the radially yieldable means 61 or 62, as the case may be, against the inside surface of the cylinder 10. The fluid sealing pressure acting upon the sealing member 60 is substantially the same as that described with reference to the deformation of the radially disposed extension portion 31 for the sealing member 26.

In Figure 7 I show a further modified form of my invention in that the sealing member 64 is not provided with laterally disposed shoulders, in which event that radially yieldable means 65 and 66 are forced radially outwardly by the sealing member 64 extruding under the inner edges of the radially yielding means in the bottom of the groove.

In all the forms of my invention I provide for making the sealing member out of relatively soft and deformable material to make a good sealing engagement and then I prevent the extrusion of the soft deformable material by the radially yieldable means.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a fluid seal for a confining wall structure defined by a member having a groove and an annular wall covering same with a clearance between the member and the wall and with non-extrusion annular blocking means substantially closing said clearance, the improvement of an annular sealing member of relatively soft material positioned in the groove and cooperatively functioning with the blocking means to seal said clearance, said annular sealing member having a sealing portion of less width than the groove engaging the annular wall and providing a sealing engagement therewith and having a radially disposed body portion resting upon the bottom of the groove for supporting the sealing portion against the annular wall to provide an initial sealing engagement therewith, said body portion having a width at least as wide as the sealing portion and having a side wall against which the pressure of the fluid being sealed presses, said body portion under the action of the pressure of the fluid against said side wall flowing radially and providing an expansible support for the sealing portion to effect an increased sealing engagement over that of the initial sealing engagement, said blocking means being adapted to be radially urged by the said body portion against the annular wall to substantially block off extrusion of the soft material into said clearance, said soft material being initially spaced from the annular wall in the region next adjacent the blocking means to provide a space for the soft material to flow and thereby allow the soft material to urge the blocking means against the annular wall before the soft material distortably fills said space.

2. A seal for sealing the clearance space between two interfitting annular members, one of said members having a groove therein and the other member having a cylindrical surface overlying said groove, said seal comprising a resilient sealing ring of rubber-like material having a solid body portion extending from sealing engagement with the base of said groove into sealing engagement with said cylindrical surface, the sealing surface of said body portion in engagement with said cylindrical surface being of less width than the groove, the body portion supporting the said sealing surface and having a supporting thickness at least as great as the width of said sealing surface, said body portion having a side wall subject to the pressure of the fluid being sealed, said body portion being deformed by such pressure to increase the pressure of said sealing surface against said cylindrical surface and the pressure of said ring against the base of the groove, radially resilient ring means disposed within said groove on the low pressure side of said sealing ring and composed of material harder than said sealing ring, said sealing ring being initially spaced from said cylindrical wall in the region adjacent said radially resilient ring means, said sealing ring being deformed into engagement with said wall adjacent said radially resilient ring means under the influence of fluid pressure, and means for forcing said radially resilient ring means into engagement with said cylindrical surface comprising a flange extending from and integral with the body portion of said sealing ring along the base of said groove and lying between the base of said groove and said radially resilient ring means and initially being spaced from said radially resilient ring means, said flange thickening under the influence of fluid pressure on said side wall and thereby urging said radially resilient ring means into engagement with said cylindrical surface, the initial spaces between said flange and said radially resilient ring means and between said sealing ring and said cylindrical wall being such that the radially resilient ring means is forced into engagement with said wall before said sealing ring is deformed into engagement with said wall adjacent said radially resilient ring means, thereby blocking extrusion of the material of said sealing ring into said clearance space.

3. A seal for sealing the clearance space between two interfitting annular members, one of said members having a groove therein and the other member having a cylindrical surface overlying said groove, said seal comprising a resilient sealing ring of rubber-like material having a solid body portion extending from sealing engagement with the base of said groove into sealing engagement with said cylindrical surface, the sealing surface of said body portion in initial engagement with said cylindrical surface being of less width than the groove, the body portion supporting the said sealing surface and having throughout a supporting thickness at least as great as the width of said sealing surface, said body portion having a side wall subject to the pressure of the fluid being sealed, said body portion being deformed by such pressure to increase the pressure of said sealing surface against said cylindrical surface and the pressure of said ring against the base of the groove, radially resilient ring means disposed within said groove on the low pressure side of said sealing ring and composed of material harder than said sealing ring, said sealing ring being initially spaced from said cylindrical wall in the region adjacent said radially resilient ring means, said sealing ring being deformed into engagement with said wall adjacent said radially resilient ring means under the influence of fluid pressure, and means for forcing said radially resilient ring means into engagement with said cylindrical surface comprising a flange extending along the base of said groove and lying between the base of said groove and said radially resilient ring means, said flange thickening under the influence of fluid pressure on said side wall and thereby urging said radially resilient ring means into engagement with said cylindrical surface thereby blocking extrusion of the material of said sealing ring into said clearance space, the radially resilient ring means being forced into engagement with said cylindrical surface before said sealing ring is deformed to fill the annular space normally existent between the sealing means, ring means and cylindrical surface.

4. A fluid seal for the radially short space between opposed surfaces of two telescoped members, the first of said members having an annular groove and the second member having a cylindrical surface opposed to said groove, said seal comprising a solid, rubber-like ring operatively assembled in the groove in deformed condition resulting from pressure exerted thereon by said members, and annular, extrusion-blocking means in the groove beside the ring and engageable with said cylindrical surface, said ring, blocking means and cylindrical surface defining an annular space into which the ring may be deformed as a result of fluid pressure exerted on the opposite side of the ring, said ring serving, when subjected to such fluid pressure, to urge said blocking means into extrusion-preventing contact with the cylindrical surface before the ring deforms into and substantially fills said annular space.

5. A fluid seal for the radially short space between opposed surfaces of two telescoped members, the first of said members having an annular groove and the second member having a cylindrical surface opposed to said groove, said seal comprising a solid, rubber-like ring operatively assembled in the groove in deformed condition resulting from pressure exerted thereon by said members, and a transversely split, radially, resilient annulus comprising a thermosetting phenol condensation material in the groove beside the ring and engageable with said cylindrical surface, said ring, blocking means and cylindrical surface defining an annular space into which the ring may be deformed as a result of fluid pressure exerted on the opposite side of the ring, said ring serving, when subjected to such fluid pressure, to urge said blocking means into extrusion-preventing contact with the cylindrical surface before the ring deforms into and substantially fills said annular space.

6. A fluid seal for the radially short space between opposed surfaces of two telescoped members, the first of said members having an annular groove and the second member having a cylindrical surface opposed to said groove, said seal comprising an endless, solid, rubber-like ring operatively assembled in fluid sealing engagement with the bottom wall of the groove in deformed condition resulting from radial pressure exerted thereon by said cylindrical surface, and annular, extrusion-blocking means in the groove beside the ring and engageable with said cylindrical surface, said ring, blocking means and cylindrical surface defining an annular space into which the ring may be deformed as a result of fluid pressure exerted on the opposite side of the ring, said ring serving, when subjected to such fluid pressure, to deform and urge said blocking means into extrusion-preventing contact with the cylindrical surface before the ring deforms into and substantially fills said annular space.

7. In a fluid seal for a confining wall structure defined by a member having a groove and an annular wall covering same with a clearance between the member and the wall and with non-extrusion annular blocking means substantially closing said clearance, the improvement of an annular sealing member of relatively soft material positioned in the groove and cooperatively functioning with the blocking means to seal said clearance, said annular sealing member having a sealing surface of less width than the groove engaging the annular wall and providing initial sealing engagement therewith and having a body portion resting upon the bottom of the groove for supporting the sealing surface against the annular wall to provide such initial sealing engagement therewith, said body portion having a width at least as wide as the sealing surface and having a lateral surface subject to the pressure of the fluid being sealed, said body acting under the pressure of the fluid against said lateral surface to create forces within said sealing member acting radially to increase the initial sealing pressure between said sealing member and said annular wall, said blocking means being adapted to be radially urged by the said sealing member to substantially block off extrusion of the soft material into said clearance, said soft material being initially spaced from the annular wall in the region next adjacent the blocking means to provide a space for the soft material to flow and thereby allow the soft material to urge the blocking means against the annular wall before the soft material distortably fills said space.

8. A fluid seal for the radially short space between opposed surfaces of two telescoped members, the first of said members having an annular groove and the second member having a cylindrical surface opposed to said groove, said seal comprising an endless, solid, rubber-like ring operatively assembled in the groove in deformed condition resulting from pressure exerted thereon by said members, the intensity of said pressure being greater between, than at, the axial ends of the area of contact of the ring with the cylindrical surface, and annular, radially resilient, extrusion-blocking means in the groove beside the ring and engageable with the opposed cylindrical surface, said ring serving, when subjected to fluid pressure exerted on the side opposite said blocking means, to deform and urge said blocking means into extrusion-preventing contact with the cylindrical surface.

9. A fluid seal for the radially short space between opposed surfaces of two telescoped members, the first of said members having an annular groove and the second member having a cylindrical surface opposed to said groove, said seal comprising an endless, solid, rubber-like ring operatively assembled in the groove in deformed condition resulting from pressure exerted thereon by said members, the intensity of said pressure being greatest substantially midway between the axial ends of the area of contact of the ring with the cylindrical surface, and annular, radially resilient extrusion-blocking means in the groove beside the ring and engageable with the opposed cylindrical surface, said ring serving, when subjected to fluid pressure exerted on the side opposite said blocking means, to deform and urge said blocking means into extrusion-preventing contact with the cylindrical surface.

10. A fluid seal for the radially short space between opposed surfaces of two telescoped members, the first of said members having an annular groove and the second member having a cylindrical surface opposed to said groove, said seal comprising an endless, solid, rubber-like ring operatively assembled in the groove in deformed condition resulting from pressure exerted thereon by said members, the intensity of said pressure being greater between than at the axial ends of the area of contact of the ring with the cylindrical surface, substantially the entire area of contact of the ring with said cylindrical surface being axially coextensive with a portion of the area of contact of the ring with the first said member, and annular, radially resilient, extrusion-blocking means in the groove beside the ring and engageable with the opposed cylindrical surface, said ring serving, when subjected to fluid pressure exerted on the side opposite said blocking means, to deform and urge said blocking means into extrusion-preventing contact with the cylindrical surface.

11. A fluid seal for the radially short space between opposed surfaces of two telescoped members, the first of said members having an annular groove defined by a bottom wall and end walls and the second member having a cylindrical surface opposed to said groove, said seal comprising an endless, solid, rubber-like ring operatively assembled with said members in contact with the bottom wall of the groove and with the cylindrical surface of the other member in deformed condition resulting from pressure exerted radially on the ring by said wall and said surface, said pressure being greatest substantially midway between the axial ends of the area of contact of the ring with the surface, substantially the entire area of contact of said ring with said cylindrical surface being axially coextensive with a portion of the area of contact of the ring with said bottom wall, and a radially expansible, extrusion-preventing annulus in the groove and engageable with one side of said ring, with the adjacent end wall of the groove and with said surface, said ring serving, when subjected to fluid pressure exerted on the opposite side of the ring, to press the said annulus against said cylindrical surface with sufficient force to prevent extrusion of the ring into said annular space.

12. A fluid seal for the radially short space between opposed surfaces of two telescoped members, the first of said members having an annular groove and the second member having a cylindrical surface opposed to said groove, said seal comprising an endless, solid, rubber-like ring operatively assembled in the groove in deformed condition resulting from pressure exerted thereon by said members, the intensity of said pressure being greater between, than at, the axial ends of the area of contact of the ring with the cylindrical surface, and annular, radially resilient, extrusion-blocking means in the groove beside the ring and engageable with the opposed cylindrical surface, said ring, blocking means and cylindrical surface defining an annular space into which the ring may be deformed as a result of fluid pressure exerted on the opposite side of the ring, said ring serving, when subjected to such fluid pressure, to deform and urge said blocking means into extrusion-preventing contact with the cylindrical surface before the ring deforms into and substantially fills said annular space.

13. A fluid seal for the radially short space between opposed surfaces of two telescoped members, the first of which members has a cylindrical surface, and the second of which has an end wall, said seal comprising a transversely split, radially expansible annulus engageable with said end wall and a rubber-like member having a side surface engageable with a side of said annulus and with the end wall radially within the annulus and a peripheral surface engageable with said cylindrical surface, said cylindrical surface, annulus and rubber-like member defining therebetween an annular space, said rubber-like member serving, when subjected to fluid pressure on the side opposite side annulus, to deform and urge said annulus against said cylindrical surface with extrusion preventing force before said rubber-like member deforms into and substantially fills said annular space.

14. A fluid seal for the radially short space between opposed surfaces of two telescoped members, the first of said members having an annular groove defined in part by an end wall and the second member having an annular wall opposed to said groove, said seal comprising a substantially solid, rubber-like ring operatively assembled in the groove in deformed condition resulting from pressure exerted thereon by said members, and annular means in the groove beside the ring and engageable with the groove end wall and also engageable with said annular wall with extrusion-blocking pressure to block extrusion of the ring into said short space, said ring being arranged to press said annular means against said groove end wall and against said annular wall when said ring is deformed by fluid pressure, said ring, annular means and annular wall defining an annular space into which the ring may deform when subjected to fluid pressure exerted on the opposite side thereof.

15. A fluid seal for the radially short space between opposed surfaces of two telescoped members, the first of said members having an annular groove defined by a bottom wall and end walls and the second member having an annular wall opposed to said groove, said seal comprising a substantially solid, rubber-like ring operatively assembled in the groove in deformed condition resulting from pressure exerted thereon by said members, the intensity of said pressure being greatest midway between the axial ends of the area of contact with said annular wall, and annular, radially resilient, extrusion-blocking means in the groove beside the ring and engageable with an end wall of said groove and with the said annular wall, said ring, annular means and annular wall defining an annular space into which the ring may deform when subjected to fluid pressure exerted on the opposite side thereof, said ring being arranged to press said annular means against an end wall of the groove and against said annular wall when said ring is deformed by such fluid pressure.

16. A fluid seal for the radially short space between opposed surfaces of two telescoped members, the first of which members has a substantially cylindrical surface and the other of which members has an end wall, said seal comprising a transversely split, radially expansible, annulus engageable with said surface and said end wall, and a rubber-like member having a side surface engageable with the side of said annulus and with said end wall radially within the annulus and a peripheral surface engageable with said substantially cylindrical surface, said substantially cylindrical surface, annulus and rubber-like member defining therebetween an annular space into which the rubber-like member may deform when subjected to fluid pressure exerted on the opposite side thereof, said rubber-like member being arranged to press said annulus against said end wall and said substantially cylindrical surface when said rubber-like member is deformed by such fluid pressure.

ELMER F. JACKMAN.